(12) United States Patent
Ellis

(10) Patent No.: US 8,210,506 B1
(45) Date of Patent: Jul. 3, 2012

(54) DIRECT CONTACT VORTEX FLOW HEAT EXCHANGER

(75) Inventor: Michael C. Ellis, Marietta, PA (US)

(73) Assignee: Advanced Cooling Technologies, Inc., Lancaster, PA (US)

( * ) Notice: Subject to any disclaimer, the term of this patent is extended or adjusted under 35 U.S.C. 154(b) by 435 days.

(21) Appl. No.: 12/592,077

(22) Filed: Nov. 19, 2009

(51) Int. Cl.
*B01F 3/04* (2006.01)

(52) U.S. Cl. ............. 261/118; 96/301; 96/314; 96/319; 96/321; 55/426; 55/459.1; 165/60

(58) Field of Classification Search ................. 261/118; 55/459.1, 426; 96/301, 314, 319, 321; 95/219; 165/60
See application file for complete search history.

(56) References Cited

U.S. PATENT DOCUMENTS 4,727,930 A    3/1988   Bruckner et al.
4,734,109 A *   3/1988   Cox ................................ 95/189

OTHER PUBLICATIONS

A.P. Bruckner, "Liquid droplet heat exchanger studies" Fig. 1, Approx 1986, Seattle, WA.
Edward L. Quinn, "Microgravity phase separation of rotating fluids in a fixed cylinder" Transactions of the American nuclear Society, p. 639, Nov. 10, 1991, San Francisco, CA.
Frederick Best, "Experimental and analytical results of a liquid-gas separator in microgravity", Space technology and applications international forum, p. 779, 1999, TX.
Frederick Best, "Liquid gas separation in microgravity" Texas A&M University, Disclosure of invention, Jul. 21, 2000, College Station, TX.
Michael Ellis, "Bubble transit time calculations" Mar. 21, 2001, College Station, TX.
Michael Clay Ellis, "The tangential velocity profile and momentum transfer within a microgravity vortex separator" Office of graduate studies of Texas A&M University. Dec. 2006.
Frederick R. Best, "Vortex separator component sizing" Texas A&M University, Disclosure of invention, Jun. 27, 2008, College Station, TX.

* cited by examiner

*Primary Examiner* — Robert A Hopkins
(74) *Attorney, Agent, or Firm* — Martin Fruitman

(57) ABSTRACT

The invention is a heat exchanger that transfers heat directly between fluids which are in direct contact with each other rather than being separated by a heat conductive wall. Gas and liquid exchange heat when the gas is moved into and through a mixing chamber, and is directed to form a high speed, forced vortex gas flow. The liquid is sprayed into the mixing chamber to form droplets traveling with and mixing with the vortex gas flow. As the gas and liquid droplets move through the mixing chamber together in the vortex flow, they exchange thermal energy by direct contact. The mixing chamber length is designed so that the gas and the liquid droplets approach thermal equilibrium as the gas-liquid mixture moves into a separation chamber. Within the separation chamber, the centrifugal force of the continuing vortex movement of the gas stream separates the liquid from the gas stream and forms a layer of liquid on the separation chamber wall. The liquid then moves down along the wall to a liquid outlet, while a baffle plate restricts the interaction of the gas stream vortex with the liquid approaching the outlet.

11 Claims, 2 Drawing Sheets

DIRECT CONTACT VORTEX FLOW HEAT EXCHANGER

BACKGROUND OF THE INVENTION

This invention deals generally with heat exchangers and more specifically with a direct contact heat exchanger that transfers heat directly between fluids which are mixed together with each other.

Heat exchangers that transfer heat between two fluids are commonplace and well understood, and one inherent limitation they have is accepted and ignored because it is generally believed to be a necessity. In typical heat exchangers the two fluids are physically separated by a solid wall because it is accepted that they cannot be mixed. However, that solid wall limits the heat transfer between the fluids regardless of how high the thermal conductivity of its material is.

Vortex movement of two fluids has been used for both the mixing and separation of fluids, but only rarely in heat transfer. One known application using vortex flow for heat transfer between two fluids is the exchange of thermal energy between two high temperature (1200 to 3000 degrees F.) gases in which the lower temperature gas is injected tangentially into a chamber while the higher temperature gas is injected as axial flow along the central axis of the device. This inlet arrangement results in vortex flow with the two gas streams separated by a stagnation boundary. While some direct contact heat exchange occurs, solid particles which enter with the higher temperature gas provide the primary means of heat transport. As a result there is still an intermediate material transferring the heat. This device is described in Heat Exchanger Design Handbook by T. Kuppan, Marcel Dekker, Inc., New York, N.Y., pp. 340-341 (2000).

Since direct contact heat transfer eliminates the weight penalty of fins, walls, and tubing of heat conductive materials, it would be very beneficial to have a direct contact heat exchanger without any intermediate heat transfer material.

SUMMARY OF THE INVENTION

The present invention attains the goals of weight reduction and heat transfer enhancement by completely eliminating any intermediate heat transfer structure and materials. This is accomplished by a heat exchanger that transfers heat directly between two fluids which are in direct contact with and mixed with each other rather than being separated by a heat conductive wall or relying on intermediate heat transfer particles.

The following descriptions are for the preferred embodiment of the invention which is subject to gravity. It should be appreciated that that the invention is not inherently gravity dependent, and the liquid and gas moving devices are sufficient to accomplish the benefits of the invention.

A gas and liquid, in the preferred embodiment air and water, exchange heat when air is moved into and through a cylindrical mixing chamber, and the air enters the mixing chamber in a single circular direction and tangential to the cylindrical wall surface to form a high speed, forced air vortex. It should be appreciated that the forced air vortex can also be produced by other means, such as a vortex generating fan. Water is sprayed into the mixing chamber, preferably in a radial direction to maximize heat transfer, to form droplets traveling across the vortex flow of air. As the water droplets move through the mixing chamber, they exchange thermal energy and also can exchange mass in the form of condensation and/or evaporation with the moving air by direct contact. The mixing chamber length is designed so that the air and the water droplets approach thermal equilibrium as the air-water mixture moves through the mixing chamber into a cylindrical separation chamber attached to the mixing chamber.

In the separation chamber, the water and any condensate in the air stream separate from the air because of the high speed vortex movement of the air stream is imparted to the heavier water droplets. This vortex motion results in centrifugal force that moves the water outward and forms a layer of water on the separation chamber wall. The water then drains down along the wall to a water outlet at the bottom of the separation chamber. Liquid pumps are used to either return water to the system heat sink or to move water from the system heat sink to the spray nozzles.

A baffle plate within the separation chamber can be used to interfere with the air flow and restrict the interaction of the air stream vortex with the water approaching the outlet. The air stream, exits the heat exchanger through an axial tube that runs along the axis of the heat exchanger within the mixing and separation chambers. An inlet or an outlet fan is the only mechanical device that is needed to impart movement to the air, and conventional piping connects the spray nozzles to a source of water.

The direct contact heat exchanger of the invention thus furnishes significantly more efficient heat exchange in a structure that has far less weight than the typical heat exchanger. The heat exchanger of the present invention has no finned metal tubes of thermally conductive dense materials, and the structure it does have can be made of lightweight and inexpensive materials such as carbon fiber or plastic.

DETAILED DESCRIPTION OF THE INVENTION

Figure 1:
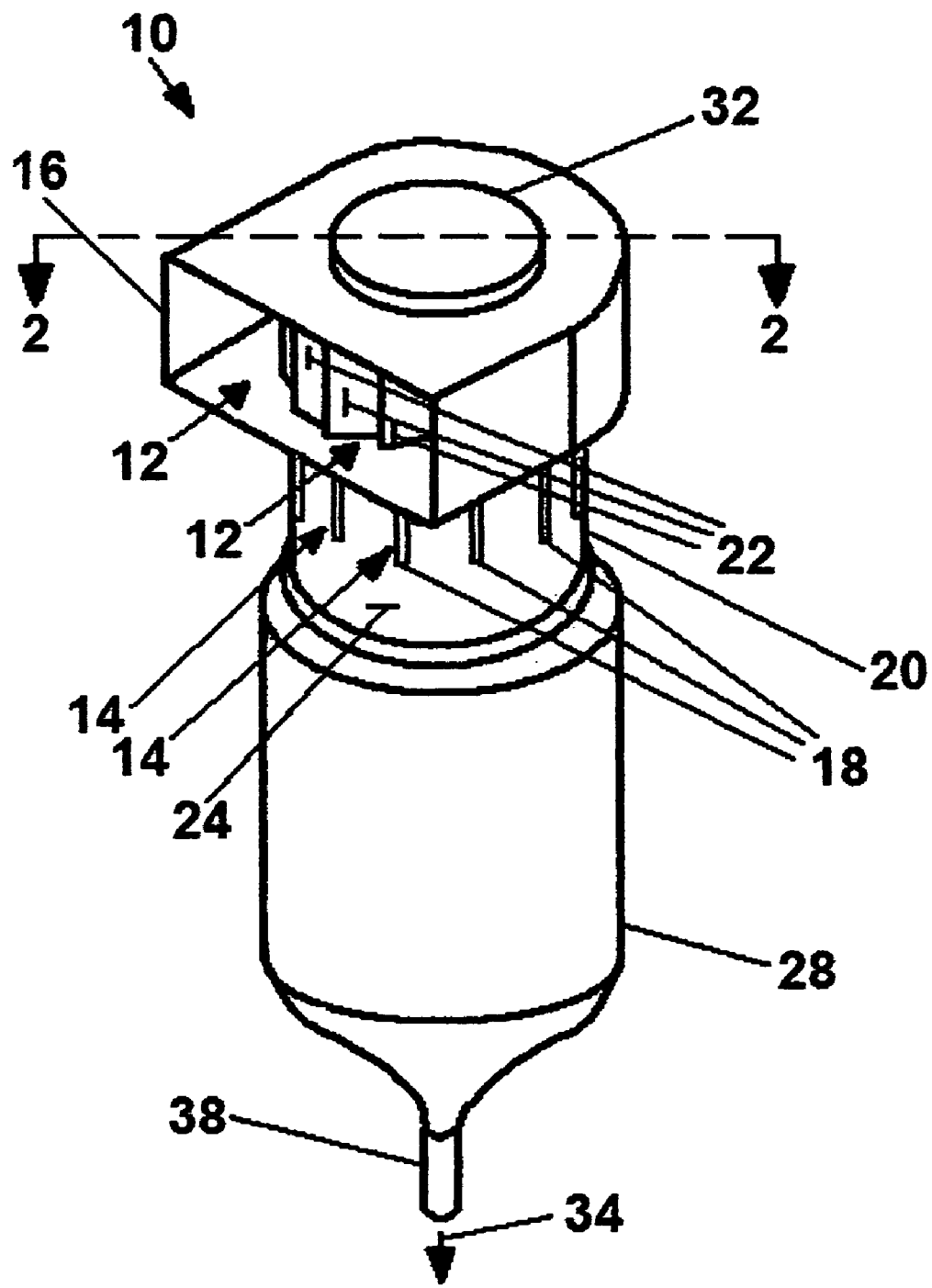
FIG. 1 is a perspective view of the preferred embodiment of the direct contact heat exchanger of the invention.
Figure 2:
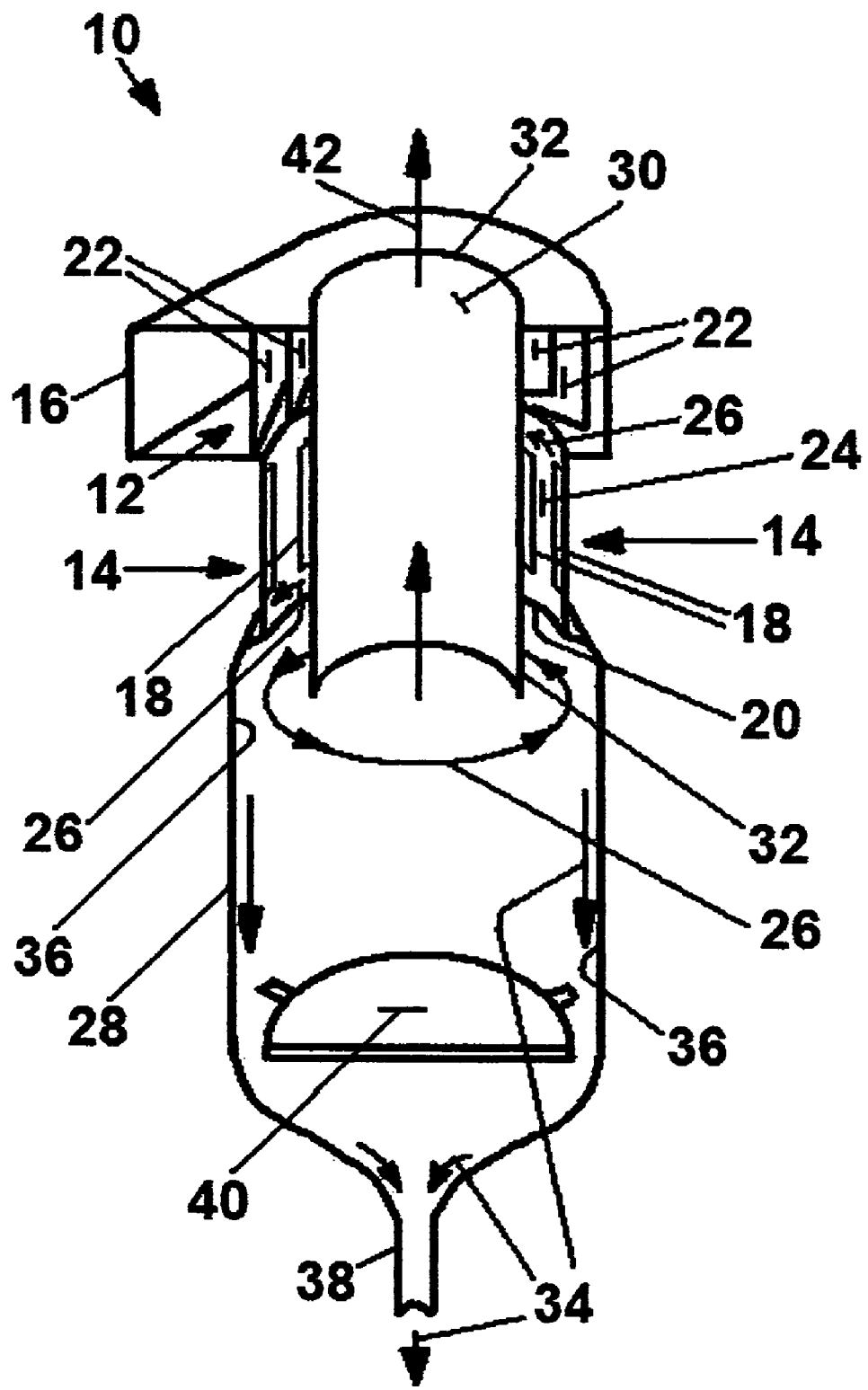
FIG. 2 is a perspective sectional view at section 2-2 of FIG. 1 of the preferred embodiment of the direct contact heat exchanger of the invention.

FIG. 1 is a perspective view of direct contact heat exchanger 10 of the preferred embodiment of the invention, and FIG. 2 is a perspective sectional view of direct contact heat exchanger 10 taken at section 2-2 of FIG. 1. It is helpful to refer to both FIG. 1 and FIG. 2 while referring to the description that follows since almost all of the parts can be seen in both figures.

Heat exchanger 10 operates to transfer heat between a gas and a liquid, which in the preferred embodiment of the invention are air and water. Incoming air 12 and incoming water 14 enter into heat exchanger 10 at air inlet 16 and water spray nozzles 18, respectively. Incoming air 12 is directed into mixing chamber 20 by multiple vanes 22 arranged in a pattern so that incoming air 12 enters mixing chamber 20 with a circular flow path and tangential to cylindrical outer wall surface 24 of mixing chamber 20. Thus, vanes 22 and wall 24 configure the flow of air 12 into high speed, forced air vortex 26 that circulates through both mixing chamber 20 and separation chamber 28. It should be appreciated that mixing chamber 20 is actually formed with its outer wall being wall 24 of mixing chamber 20 and its inner wall being wall 30 (see FIG. 2) of air outlet tube 32. The function of air outlet tube 32 is described below. Mixing chamber 20 therefore actually has a toroidal cross section that aids in the formation of the vortex flow 26 of incoming air 12. As can be seen in FIG. 2, this toroidal cross section shape also extends somewhat into separation chamber 28.

In the preferred embodiment shown incoming water 14 enters into mixing chamber 20 through spray nozzles 18, which are connected to a source of water by conventional piping (not shown), and is directed radially relative to vortex air flow 26. Incoming water 14 thus thoroughly mixes with vortex air flow 26, forms into small droplets and is picked up by and moves with vortex air flow 26. As the air and droplets together circle around and move lower through mixing chamber 20, they exchange thermal energy by direct contact. This energy exchange can either move heat from the water to the air or in the opposite direction. The length of mixing chamber 20 is selected so that the air and the water droplets approach thermal equilibrium before the air and the water droplets are separated within cylindrical separation chamber 28 which is attached below mixing chamber 20.

In separation chamber 28, the water along with any condensate in the air separates from the air because the high speed vortex movement of air stream 26 is imparted to the heavier water droplets mixed with the air. This vortex motion results in centrifugal force which moves the water outward and forms a layer of output water 34 on outer wall 36 of separation chamber 28. Output water 34 moves along separation chamber wall 36 to and out of water outlet 38 at the bottom of the separation chamber 28.

In the preferred embodiment of the invention, output water 34 is transported from water outlet 38 by attached pipes (not shown) to a heat source or sink where it picks up or deposits thermal energy and is then moved back to spray nozzles 18 to begin the heat transfer cycle again. Such water movement is accomplished by conventional means such as pumps (not shown).

Baffle plate 40 is located near the bottom of separation chamber 28 with space between wall 36 and baffle plate 40 to permit the drainage of output water 34 along wall 36. Baffle plate 40 restricts the interaction of the air stream vortex 26 with outlet water 34 at the bottom of separation chamber 28. Outlet air 42 is drawn or driven out of heat exchanger 10 through air outlet tube 32 that has an air inlet within separation chamber 28.

Outlet air 42 from which the water has been separated moves into and through air outlet tube 32 for either disposal, heating, or cooling and may be recycled into air inlet 16. Such air movement is accomplished by conventional means such as a blower (not shown) interconnected with either air inlet 16 or air outlet tube 32 or both.

The basic process of the invention is as follows.

Enclosing a mixture of gas and liquid with different thermal energies of the gas and liquid within a container; maintaining the mixture intact for a long enough time for the thermal energies of the gas and liquid to approach thermal equilibrium; producing a vortex flow of the gas and liquid mixture within the container with the speed of the vortex flow sufficient to impart centrifugal force to the liquid so that the liquid is separated from the gas; providing means to collect the separated liquid; and providing means to remove the separated gas and the collected liquid from the container.

The heat transfer between a liquid and a gas is thereby accomplished with the direct contact heat exchanger of the invention with no conduction of heat other than directly between the gas and liquid. The heat exchanger of the invention thereby is a structure that has far less weight than the typical heat exchanger, and it has significantly less heat flow resistance.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the specific construction of the gas and liquid inputs can be varied, as long as the heat exchanger produces a vortex flow of gas and liquid which is sufficient to thoroughly mix the two and to also impart enough centrifugal motion to the liquid to separate it out from the gas once the two have approached thermal equilibrium. For instance, the liquid can be introduced at the mixing chamber axis and sprayed out. The liquid and gas can also be premixed before introduction to the heat exchanger, and the vortex flow can also be created by other means, such as internal fans. Moreover, the mixing chamber and the separation chamber need not be cylindrical as long as the vortex gas flow is maintained.

What is claimed as new and for which Letters patent of the United States are desired to be secured is:

1. A direct contact heat exchanger for a gas and a liquid comprising:

a mixing chamber with a longitudinal length dimension, a closed end, and an open end, comprising: an outer wall; a gas outlet tube with first and second open ends, with the gas outlet tube extending through the length of and beyond the ends of the mixing chamber; a closed end of the mixing chamber attached and sealed to the outer wall and the outside surface of the gas outlet tube; and an open end of the mixing chamber remote from the closed end; with the mixing chamber outer wall, the gas outlet tube, and the mixing chamber closed end together forming the mixing chamber into a volume with the longitudinal length dimension of the mixing chamber extending from the closed end to a remote open end of the mixing chamber;

a gas inlet for furnishing a heat exchange gas into the mixing chamber with the gas inlet;

a gas moving device interconnected with the heat exchanger to move the heat exchange gas through the heat exchanger;

a gas directing structure that causes the heat exchange gas to form into a fast moving vortex gas stream moving around the volume of the mixing chamber;

liquid inlets for a heat exchange liquid comprising devices directing the liquid across the vortex gas stream so that the liquid is formed into droplets that are mixed with the vortex gas stream, and the droplets move through the mixing chamber within the vortex gas stream at a speed sufficient to generate a centrifugal force that moves the droplets toward the outer walls of the heat exchanger where the droplets accumulate;

a separation chamber with an outer wall attached and sealed to the open end of the mixing chamber to form the heat exchanger into a continuous enclosure extending in the longitudinal length dimension of the mixing chamber, with the first open end of the gas outlet tube extending beyond the mixing chamber and into the separation chamber;

a liquid outlet from the separation chamber located at the end of the separation chamber remote from the mixing chamber and to which the accumulated liquid droplets flow; and a baffle plate located within the separation chamber between the mixing chamber and the liquid outlet, with space provided between the baffle plate and the outer wall of the separation chamber to permit liquid to flow along the outer wall between the outer wall and the baffle plate.

2. The heat exchanger of claim 1 wherein the mixing chamber volume is toroidal.

3. The heat exchanger of claim 1 wherein the gas directing structure comprises multiple vanes arranged in a pattern around the mixing chamber.

4. The heat exchanger of claim 1 wherein the gas moving device is interconnected with the second open end of the gas outlet tube of the mixing chamber to move the heat exchange gas through the heat exchanger.

5. The heat exchanger of claim 1 wherein the gas moving device is interconnected with the gas inlet of the mixing chamber to move the heat exchange gas through the heat exchanger.

6. The heat exchanger of claim 1 wherein the gas directing structure is integrated with the gas moving device.

7. The heat exchanger of claim 1 wherein the gas moving device is a blower.

8. The heat exchanger of claim 1 wherein the outer wall of the mixing chamber is a cylinder.

9. The heat exchanger of claim 1 wherein the separation chamber is a cylinder.

10. The heat exchanger of claim 1 wherein the liquid inlets are spray devices located at the mixing chamber outer wall.

11. The heat exchanger of claim 1 wherein the length of the mixing chamber is selected so that the gas and the liquid droplets approach thermal equilibrium before they are separated.

* * * * *